Oct. 10, 1967 N. T. E. A. BAAK 3,346,357
PROCESS FOR BONDING DEVITRIFIED SURFACES
Filed Dec. 17, 1962 2 Sheets-Sheet 2
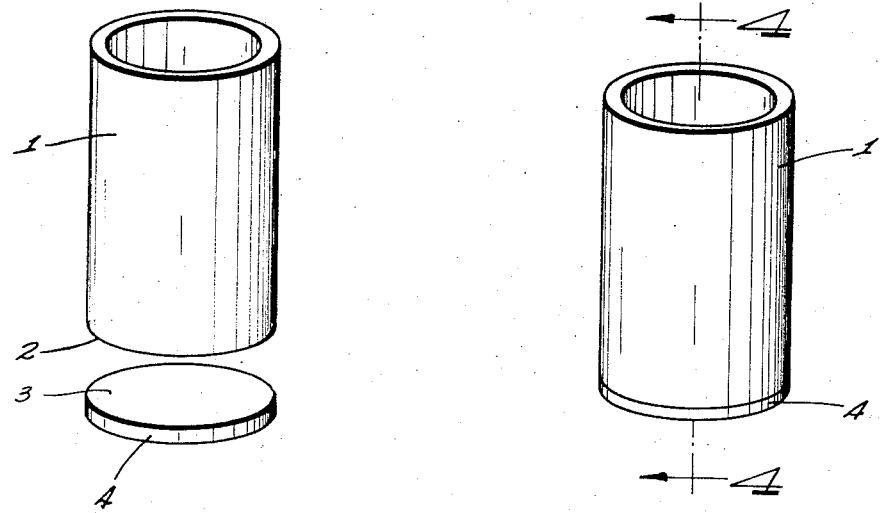
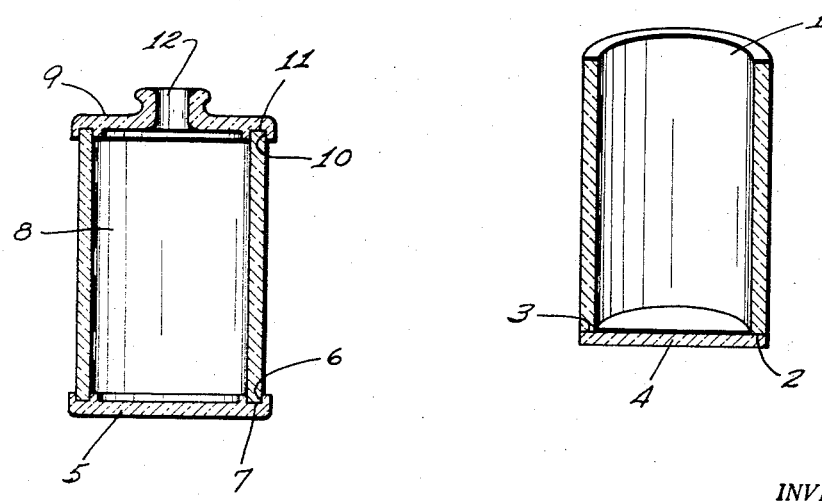
INVENTOR.
NILS TRYGGVE E.A. BAAK
BY Charles S. Lynch
W. A. Schaich
ATTORNEYS 3,346,357
PROCESS FOR BONDING DEVITRIFIED SURFACES
Nils Tryggve E. A. Baak, Toledo, Ohio, assignor to Owens-Illinois, Inc., a corporation of Ohio
Filed Dec. 17, 1962, Ser. No. 245,291
7 Claims. (Cl. 65—33)

This invention relates to a process for securely and tenaciously bonding devitrified surfaces together and, more particularly, to a process for bonding vitreous and/or devitrified articles to another devitrified article by a bond which is at least as strong as the devitrified article itself.

Devitrified structures consisting essentially of a multiplicity of interlocked inorganic crystals dispersed in a glassy matrix are known. The devitrified or ceramic structure is formed by incorporating a nucleating agent in a vitreous composition and then subjecting the composition to a heat treatment whereby devitrification is initiated and fostered until the composition becomes essentially a crystalline structure, i.e. on the order of 90 to 95% crystalline. The glassy matrix consists essentially of the uncrystallized portion of the glass remaining after crystallization of the crystals. Such devitrified structures have extremely high flexural strengths on the order of as much as 100,000 to 150,000 pounds per square inch.

Devitrification is preferably accomplished after the vitreous composition is melted and formed into an article of the size and shape desired, so that conventional glass-forming methods, such as pressing, blowing tube and rod drawing can be utilized. In a known process, described in U.S. Patent 2,920,971, the article is subjected to a temperature range between the maximum nucleation temperature of the nucleating agent ($TiO_2$) and the annealing temperature of the vitreous mass for a sufficient period of time to form nuclei of the crystallizable compounds in the vitreous mass. It is stated that the temperature is then increased to crystallize on the nuclei a major portion, i.e., more than 50 weight percent and preferably as much as 90-95 weight percent, of the crystallizable compounds at a temperature above the annealing point but below the temperature at which the predominant crystalline phase will redissolve.

In another process, described in co-pending U.S. application S.N. 846,551, filed Oct. 15, 1959, now Patent No. 3,117,881 issued Jan. 17, 1964, which process is incorporated herein by reference, the vitreous article is maintained at a temperature corresponding substantially to the annealing point (viscosity of log 13.5) and held at substantially the annealing temperature with a variation of from about 20° F. below the annealing temperature to about 50° F. above such temperature for a time sufficient to form submicroscopic crystals of the nucleating agent dispersed throughout the glassy matrix. The article is then maintained at a temperature preferably about 10 to 30° F. below the fiber softening point of the composition for a period of time sufficient to develop in the mass a rigid crystalline framework. The article is then maintained at a temperature 150° to 300° F. above the fiber softening point of the original glass composition for a period of time sufficient to crystallize the articles to the degree desired, preferably 90-95% crystalline, but which can vary from 50-98%. The principal nucleating agent is $ZrO_2$, which is preferably in admixture with less than 2 weight percent of a secondary nucleant oxide selected from the group consisting of $TiO_2$, CoO, NiO, $V_2O_5$, $MoO_3$, $ThO_2$ and $Fe_2O_3$.

The ceramic or devitrified products thus produced possess a very fine-grained and uniform crystalline structure of high flexural strength, enabling articles having extremely thin walls to be produced. Such products have been found to be excellent for various uses, for example, as ovenware, coffee pots, tea pots, dinnerware, and the like.

In making devitrified articles such as cups, tea pots, coffee pots, casseroles, and other objects having handles or bases, unless the handles or bases are formed simultaneously with the body, thus requiring special molds for each particular configuration desired, a serious problem arises in attaching handles and bases to the devitrified or ceramic articles. In the conventional glass art, handles, bases, knobs, spouts, and the like, are formed independently and then are joined to the glass body by a flame or other high-temperature welding process. In the pottery and ceramic art, the sealing of articles such as handles to the ceramic body produces weak joints both before and after firing, and the strength of the article is no greater than the strength of the seal holding the handle to the article.

However, when an attempt is made to join a devitrified handle, base, etc., to a devitrified structure such as a coffee pot, by the conventional methods used in the glass or pottery art, no satisfactory bond can be obtained except by very careful heating over a relatively long period of time. Using the known welding techniques requires a temperature in excess of the deformation temperature of the devitrified structures and using a lower temperature over a long period of time results in a bond less satisfactory than the one produced by the present invention.

Accordingly, it is an object of this invention to provide a method for readily bonding the surfaces of devitrified articles together.

Another object of this invention is to provide a process for readily bonding devitrified handles, bases, spouts, knobs, and the like to devitrified articles.

A further object of this invention is to provide a method for readily bonding vitreous articles, including vitreous handles, bases, spouts, knobs, and the like, to devitrified articles and subsequently devitrifying the vitreous article to form an essentially devitrified structure.

In attaining the objects of this invention, one feature resides in contacting a devitrified surface with a glass surface wherein the glass has essentially the same coefficient of expansion as the devitrified surface, and applying sufficient heat to the adjoining surfaces to soften the glass and cause it to flow and diffuse into the devitrified surface to form a tenaciously adhering bond or seal at the adjoining surfaces and then devitrify the glass surface.

Another feature of this invention resides in subjecting the adhering structures to the temperatures necessary to devitrify the entire glass body to form a substantially completely devitrified structure.

Other objects, features, and advantages of the invention will become more apparent to those skilled in the art from a reading of the following disclosure taken in conjunction with the attached drawing, wherein FIG. 1 is a cross-sectional view taken by an electron microscope and showing the crystalline structure of the adjoining edges of a devitrified and a vitreous body bonded together by the process of the invention;

FIG. 2 is an exploded view of an embodiment of a container to be made in accordance with the process of the invention;

FIG. 3 is a side elevational view of a container made in accordance with the process of the invention;

FIG. 4 is a cross-sectional view of the container drawn along lines 4—4 of FIG. 3; and FIG. 5 is a cross-sectional view of another embodiment of a container made in accordance with the present invention.

Figure 1:
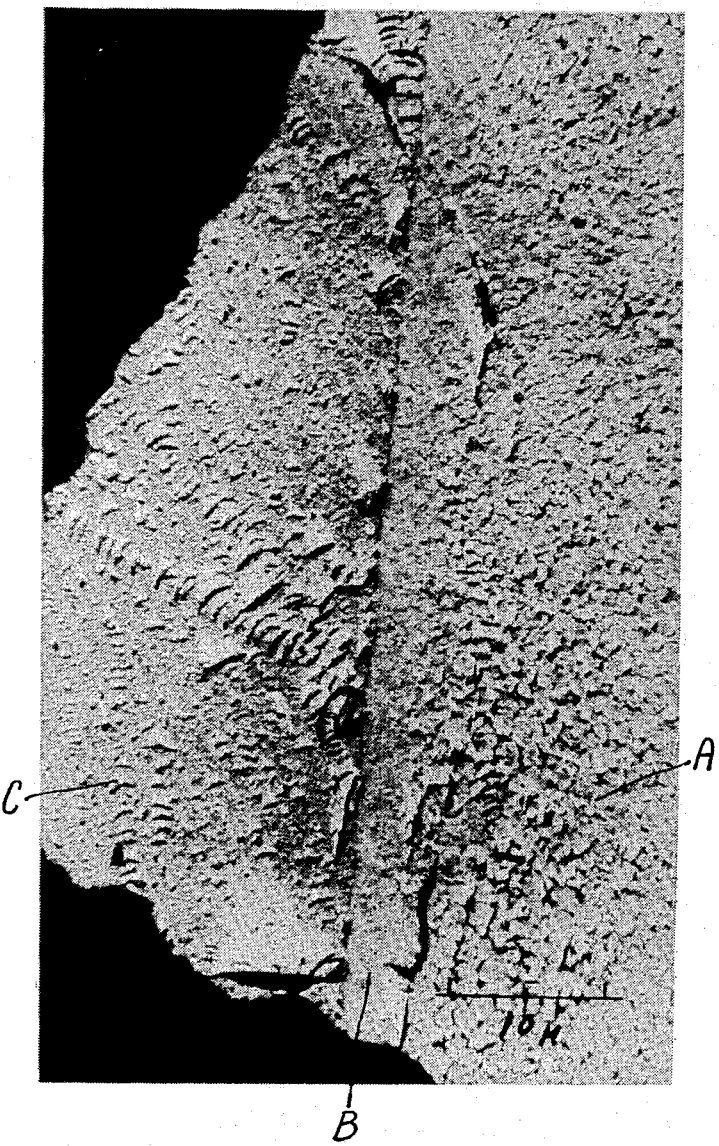

While the following examples are submitted as being illustrative of the method of the present invention, it is to be understood that the examples in no way limit the scope of the disclosed invention.

*Example I*

A batch composition consisting of petalite, alumina, silica, titanium dioxide, potash, boric acid, calcined magnesium oxide and niter ($NaNO_3$) was mixed in a cone blender mixer and then melted in a platinum crucible held in a gas-fired furnace under oxidizing conditions for 64 hours at a temperature of 1650° C. The molten glass was then removed in the form of glass rods which were pulled from the molten mass by conventional methods and then allowed to cool to room temperature. Several glass rods were subsequently devitrified by subjecting them to a temperature of 1000° C. for a period of 17 hours and then allowed to cool to room temperature. A plurality of disks of equal thickness were then cut from the devitrified rods and also from the vitreous rods.

The batch constituents were employed in proportions to make a glass of the following calculated composition in weight percent:

| | Percent |
|---|---|
| $SiO_2$ | 70.2 |
| $B_2O_3$ | 0.1 |
| $TiO_2$ | 4.9 |
| $Al_2O_3$ | 18.5 |
| $MgO$ | 3.0 |
| $Na_2O$ | 0.5 |
| $K_2O$ | 0.1 |
| $Li_2O$ | 2.7 |

A vitreous disk was placed upon a devitrified disk and the two disks were subjected to a temperature of 1000° C. for a period of 10 minutes. Upon cooling to room temperature, an effort to pull the disks apart failed.

The bond joining the two disks was examined under the electron microscope. An electron photomicrograph was made by following known techniques of cutting the disk to provide a cross-sectional view of the sealed surfaces and then etching the surfaces for 12 minutes in a solution of 1% HF and 4% HCl. A replica was prepared by applying a cellulose strip to the etched surface and then stripping it off, leaving an impression of the surface on the strip. Carbon was vaporized onto the cellulose surface in a vacuum maintained at $10^{-6}$ mm. followed by the application of chromium vapors. The photomicrograph of the drawing was made with an electron microscope and the crystals shown therein have been magnified 3200 times.

As seen in FIGURE 1, the coarsely textured region A with a grain size of two to three microns is the previously devitrified glass, and the finely textured region B having the appearance of a fairly uniform strip is the area within the originally devitrified portion into which the glass has flowed, diffused, and then devitrified. It will be noted that the originally vitreous portion C of the structure has also devitrified. Thus, the initial bonding between the devitrified and glassy disks is achieved as a result of processes of diffusion and flow of the surface of the latter into the surface of the former, and the final strength of the bond results from crystallization of the vitreous portion in intimate contact with the devitrified portion. Some recrystallization of the devitrified disk does occur during the heat cycle of the present process, thus accounting for the coarser appearance thereof in the micrograph. The thickness of the bonding layer B is approximately 3 to 4 microns, and this is sufficient to impart a very high strength to the bond joining the two surfaces.

*Example II*

Two devitrified disks of the same composition, configuration and size as in Example I were placed one above the other in stacked relation as in Example I. The disks were then subjected to a temperature of 1000° C. for a period of 10 minutes and then allowed to cool to room temperature. When picked up, the disks easily separated, and there was no indication that there was ever any adhesion between the two adjacent surfaces.

*Example III*

Two additional devitrified disks identical to those in Example II were placed in contact with each other in the same manner as described above, and were then subjected to a temperature of 1000° C. for a period of 18 hours before being permitted to cool to room temperature. While there was some slight adhesion of the surfaces, the disks were easily pulled apart by the operator's fingers.

*Example IV*

Two devitrified disks identical to those in Example II with a thin, annular glass disk of the same vitreous composition were placed in stacked relation with the glass disk in the middle. The disks were subjected to a temperature of 900° C. for a period of 15 minutes and allowed to cool. The two devitrified disks were bonded together and the glass layer had devitrified to form a structural unit which could not be separated.

Other devitrified articles having different compositions are securely bonded together by placing a glassy layer or even a glass frit, preferably having the same vitreous composition as the devitrified or ceramic article, or at least substantially the same coefficient of expansion. Thus, utilizing the process of the present invention, a devitrified cup can have a glass handle securely bonded thereto by applying localized heat to the adjoining surfaces to cause a diffusion and flow of the glass surface into the adjoining devitrified surface, and then devitrifying the glass. The remainder of the glass handle can also be devitrified at the same time or by a subsequent heat-treating operation.

Another area in which the process of the present invention is useful is in the formation of cylindrical ceramic containers to compete with the presently available metal beer cans, metal frozen fruit juice concentrate cans, and the like. While glass bottles have been widely used for beer, the thickness of the bottle which imparts the required strength thereto is such that it adds considerably to the weight of the package. Furthermore, since glass bottles are relatively fragile, as compared to metal cans, the bottles can be filled and capped at only about one-fifth the speed of the metal cans. Any attempts to materially increase the bottling speed results in breakage of a number of the filled bottles as they are jostled together in the conveyors leading to and away from the filling stations and to the packaging stations. Since the devitrified or ceramic composition has a vastly greater mechanical strength than the same composition in vitreous form, it will be possible to make competing ceramic containers having much thinner walls than the conventional bottles presently used for beer and which can be bottled at speeds approaching or equaling the speeds at which metal containers are filled. Such ceramic containers can easily be formed in cylindrical shapes of the desired length, and glass bases can be readily secured to one end of each cylinder, utilizing the process of the present invention whereby the base is securely bonded to the peripheral edge of the cylinder and then devitrified. The requisite top can be provided for each container and may also be sealed thereto by the process disclosed herein.

As may be seen in FIGS. 2–5, inclusive, a cylindrical container comprising a body portion 1 of a devitrified material has its bottom peripheral edge or surface 2 placed in contact with the corresponding peripheral edge or surface 3 of a vitreous base 4, preferably of the same composition as the devitrified body 1, or at least having the same thermal coefficient of expansion as the body 1, when subsequently devitrified. The two members are then subjected to heat sufficient to soften slightly the vitreous base 4, causing the peripheral surface 3 thereof to diffuse into the adjoining devitrified surface 2 of the body. The surface 3 is then devitrified and, preferably, the entire base 4 is devitrified to form a completely devitrified container of a strength which is considerably higher than a corresponding glass container.

In the embodiment illustrated in FIG. 5, the glass base 5 is formed with a peripheral groove 6 into which the bottom peripheral edge or surface 7 of a cylindrical ceramic body 8 is fitted. By maintaining a sufficient pressure on the adjoining surfaces and applying the required heat thereto, the glass base is softened and a portion thereof diffuses into the adjacent devitrified surface 8. The glass base is then devitrified to form a strong seal with the peripheral edge of the container. To make a bottle, an annular, vitreous top portion 9, of the configuration shown in FIG. 5, is also provided with a peripheral groove 10, which permits the top 9 to be placed onto and supported by the upper edge 11 of the cylinder 8. Again, the application of heat to the adjacent contacting surfaces 10, 11 causes the glass portion to diffuse into the devitrified portion, and then the glass portion and preferably the entire top portion is devitrified by any of the processes described above. The top portion 9 is provided with an orifice 12 which is capped after the container is filled.

As will now be obvious to those skilled in the art from the above disclosure, glass bases and tops of other structural configurations may be designed for sealing with a devitrified cylindrical body to form a satisfactory container. Furthermore, the container may originally comprise a vitreous hollow body which is subsequently secured to a devitrified or ceramic base and/or top by the disclosed process. In the event both the body portion and the top and/or base portions are of devitrified material, a vitreous layer or frit may be inserted between the adjoining surfaces to be sealed, and the vitreous layer or frit then devitrified by the application of heat thereto to form a strong bond between the members. As disclosed above, the vitreous layer or frit is preferably of the same composition as the devitrified material, or at least must have substantially the same thermal coefficient of expansion as the devitrified material, when devitrified.

The process of the present invention is suitable for use with devitrified articles or products which consist essentially of interlocked inorganic crystals dispersed in a glassy matrix wherein the crystals are on the order of from below 40 microns in diameter to about 0.01 micron, and constitute from at least 50 volume percent to about 98 volume percent of the devitrified article, and preferably at least about 80 volume percent. The crystals are usually above 0.01 micron, more often above 0.1 micron, and are formed in situ from a glass consisting essentially of inorganic constituents and the glassy matrix consists essentially of the uncrystallized portion. Included within the term "inorganic constituents" may be from 1–20% by weight of $TiO_2$, and at least 50%, exclusive of the $TiO_2$, of crystallizable glass-making ingredients such as $SiO_2$, $Al_2O_3$, $P_2O_5$, $B_2O_3$, $GeO_2$ and the like. Other metal oxides including $LiO_2$, $BeO$, $MgO$, $CaO$, $ZnO$, $SrO$, $CdO$, $BaO$, $PbO$, $MnO$, $FeO$, $CoO$, $NiO$, and the like may also be present.

Where the devitrified material comprises a multiplicity of the interlocked inorganic crystals dispersed in a glassy matrix formed by devitrifying a thermally crystallizable glass containing at least 6 weight percent of $ZrO_2$ and an oxide of the group $TiO_2$ $MoO_3$, $Fe_2O_3$, $V_2O_5$, $CoO$, $NiO$ and $ThO$ in an amount less than 2 weight percent, with the sum of $ZrO_2$ and the selected oxide being at least 7.5 but less than 10 weight percent of the composition, the thermally crystallizable glass contains other glass-making ingredients as follows:

TABLE 1

|  | Broad Range, percent | Preferred Range, percent |
|---|---|---|
| $SiO_2$ | 40–70 | 40–60 |
| $Al_2O_3$ | 15–35 | 17–32 |
| $MgO$ | 5–15 | 6–12 |

Various modifiers can be added to the thermally crystallizable compositions to vary the melting and forming characteristics thereof and to vary the degree and readiness of devitrification. Included are $SnO_2$, $NaF$, $Na_2O$, $K_2O$, $CaF_2$, $Li_2O$, $LiF$, $B_2O_3$, $KF$, $CaO$, $PbO$, $BaO$, and the like.

While in the several examples of the process described above no additional pressure was applied to the contacting surfaces during the heat cycle, it is to be understood that the application of pressure will assist the formation of an even stronger bond. Or, for a given glass, a lower temperature can be employed when pressure is applied. The temperature employed is preferably above the annealing point of the original glass, usually at least 25–75° C. above the annealing point. As will be understood, after crystallization has begun temperatures can be raised to temperatures even approaching the liquids of the glass, but usually to no higher than 100° C. below such temperature.

Having fully described the invention, what is claimed is:

1. A process of forming an article having at least two members, one of said members being a devitrified member consisting essentially of a multiplicity of interlocked inorganic crystals dispersed in a glassy matrix and formed by crystallization in situ from a glass consisting essentially of inorganic constituents and a nucleating agent therefor, said glassy matrix consisting essentially of the uncrystallized portion of the glass, the other of said members being a devitrifiable vitreous member consisting essentially of inorganic constituents and containing a nucleating agent therefor, comprising the steps of placing a surface of said devitrified member into contact with a surface of said devitrifiable vitreous member and subjecting the adjoining contacting surfaces to a temperature sufficient to soften the surface of said vitreous member and diffuse it into the surface of said devitrified member and then further subjecting said adjoining contacting surfaces for a period of time to temperatures sufficient to thermally devitrify said vitreous surface and to bond said surfaces with a devitrified seal.

2. The process as defined in claim 1 wherein said period of time and said temperatures to which said surfaces are subjected are sufficient to thermally devitrify said vitreous member.

3. The process as defined in claim 2 wherein said vitreous member, when subsequently devitrified, has substantially the same coefficient of thermal expansion as said devitrified member.

4. The process as defined in claim 1 wherein the composition of said devitrifiable vitreous member is the same as that of the devitrified member.

5. A process for making a container having a base member and a hollow body member secured to said base member, one of said members being a devitrified member consisting essentially of a multiplicity of interlocked inorganic crystals dispersed in a glassy matrix and formed by crystallization in situ from a glass consisting essentially of inorganic constituents and a nucleating agent therefor, said glassy matrix consisting essentially of the uncrystallized portion of the glass, the other of said members being a devitrifiable vitreous member consisting essentially of inorganic constituents and containing a nucleating agent therefor, comprising the step of placing one end of said hollow body member in contact with the peripheral surface of said base member and subjecting the adjoining contacting surfaces to a temperature sufficient to soften the vitreous surface and diffuse it into the devitrified surface and then further subjecting said vitreous surface for a period of time to temperatures sufficient to thermally devitrify said vitreous surface to securely bond said body member to said base member with a devitrified seal.

6. The process as defined in claim 5 wherein said vitreous surface, when subsequently devitrified, has substantially the same coefficient of thermal expansion as said member.

7. A process for making a container having a base member and a hollow body member secured to said base member, one of said members being a devitrified member consisting essentially of a multiplicity of interlocked inorganic crystals dispersed in a glassy matrix and constituting at least 50% of the member and formed by crystallization in situ from a glass consisting essentially of inorganic constituents and a nucleating agent therefor, said glassy matrix consisting essentially of the uncrystallized portion of the glass, the other of said members being a vitreous member of the same composition as the glass from which said devitrified member was formed, comprising the step of placing one end of said hollow body member in contact with the peripheral surface of said base member and subjecting the adjoining surfaces to a temperature sufficient to soften the vitreous surface and diffuse it into the devitrified surface, and then further subjecting said vitreous surface for a period of time to a temperature sufficient to thermally devitrify said vitreous surface and thus securely bond said body member to said base.

References Cited

UNITED STATES PATENTS

| 2,889,952 | 6/1959 | Claypoole | 65—33 X |
| 2,920,971 | 1/1960 | Stookey | 65—33 |
| 3,061,664 | 10/1962 | Kegg | 65—33 |
| 3,075,860 | 1/1963 | Veres | 65—33 X |
| 3,088,835 | 5/1963 | Pirooz | 65—33 X |
| 3,239,322 | 3/1966 | Carter | 65—33 X |

OTHER REFERENCES

"Handbook of Glass Manufacture," vol. II by Fay V. Tooley, published by Ogden Publishing Co., 55 W. 42nd St., New York 36, N.Y., 1960, pp. 187–194.

DONALL H. SYLVESTER, *Primary Examiner.*

S. LEON BASHORE, *Examiner.*

F. W. MIGA, *Assistant Examiner.*